A. ROGERS.
Tire Shrinker.
No. 67,806.
Patented Aug. 13, 1867.
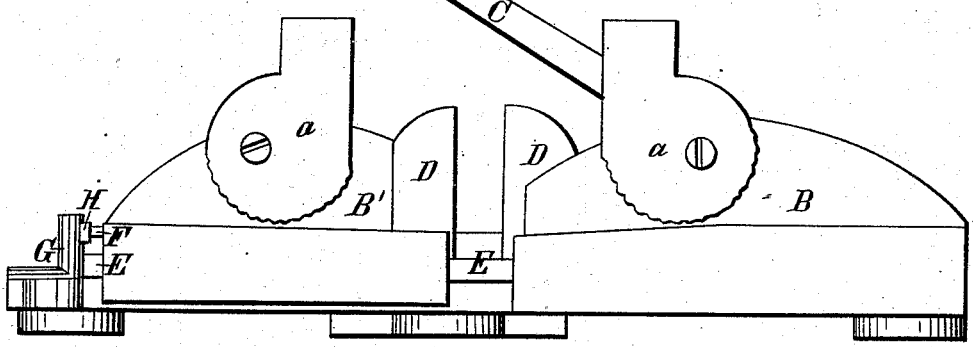
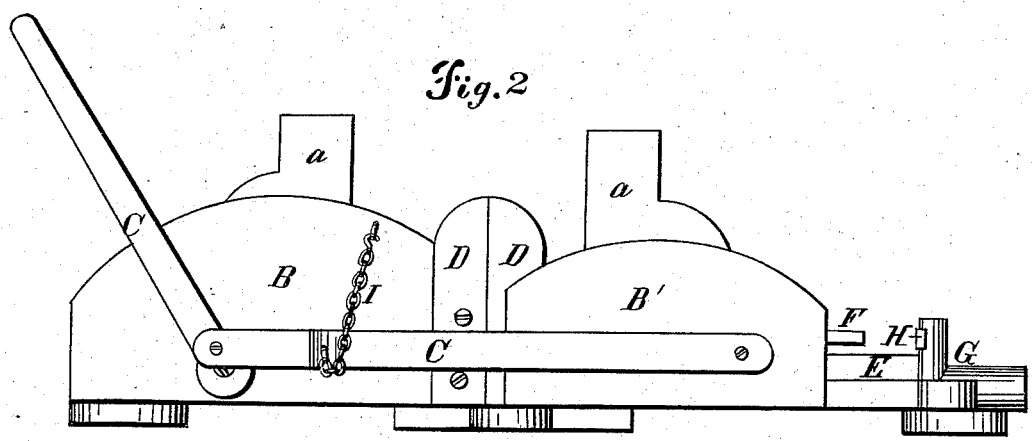

United States Patent Office

ANDROSS ROGERS, OF FREEPORT, ILLINOIS.

*Letters Patent No. 67,806, dated August 13, 1867.*

IMPROVEMENT IN TIRE-SHRINKERS.

*The Schedule referred to in these Letters Patent and making part of the same.*

TO ALL WHOM IT MAY CONCERN:

Be it known that I, ANDROSS ROGERS, of Freeport, State of Illinois, have invented certain new and useful improvements in Tire-Shrinkers; and I declare the following to be a full, true, and exact description of the same, reference being had to the accompanying drawings, which form a part of these specifications, and the letters of reference marked thereon.

Figure 1 represents a front view of the shrinker.

Figure 2 represents a rear view of the same.

Letters A A represent two self-acting and self-adjusting cams, which are pivoted to the sides B B, so as to allow them a reciprocating motion, between which the tires are placed and firmly held, without marring, while, by a stroke of the lever, the tire is shrunk any required distance. Letters B B' represent the two sides, to which the cams A A are attached; B' being movable, and the other stationary. Letter C represents a lever, by which the side B' is operated. The lever consists of two pieces, the one being pivoted to the side B, and has a reciprocating motion, while the other is pivoted to both sides, and has a horizontal reciprocating motion, so as to bring the blades of the shears together. Letters D D represent the blades of the shears, and are attached, one to the movable and the other to the stationary side, and are used for the purpose of cutting and trimming the tires. Letter E represents a slide, upon which the movable side is operated by means of the lever, and is firmly supported and attached to the bed of machine, and acts as a guide to the side B'. Letter F represents a punch, which is fastened to and governed by the movable side B', and is used for the purpose of making holes in the tire, so that it may be secured to the wheels. Letter G represents the punch-block, which is secured to one end of the frame, so that the side B', in moving backwards and forwards, works upon it, and is used for the purpose of supporting the movable die H. The said die can be entirely removed, when necessary, and is provided with a number of holes, into which the punch F works, when set in motion, by the lever C. To the lever C are attached a chain and pin, I, for the purpose of regulating the stroke of the lever. The punch-block G and the shear-blades D D can be easily removed for repairs, whenever necessary. There is a series of pin-holes in the stationary side B, so that the pin which is attached to the chain may be moved, so as to exactly regulate the distance which the tire is to be shrunk.

The advantages of my invention consist in doing away with the greater part of the manual labor, so that tires can be adjusted and shrunk in less than one-half of the time usually employed.

Having thus described my invention, what I claim, and desire to secure by Letters Patent, is—

1. The shear-blades D D, when constructed and operated in the manner herein set forth.

2. The combination of the lever C, the side B', the punch F, and the shear-blades D D, the whole constructed, arranged, and operating as herein specified.

In testimony that I claim the foregoing as my own, I hereby affix my signature in the presence of two witnesses.

ANDROSS ROGERS.

Witnesses:
C. C. SHULER,
S. B. PECK.